3,228,936
FLUORINATION OF UREA, THIOUREA, GUANIDINE, AND MELAMINE
Ralph A. Davis and Kenneth O. Groves, both of Midland, Mich., assignors to The Dow Chemical Company, Midland, Mich., a corporation of Delaware
No Drawing. Filed Oct. 17, 1960, Ser. No. 63,215
10 Claims. (Cl. 260—249.6)

This invention relates to the fluorination of amines, and more particularly to the fluorination of amines of carbamic and cyanuric acids by the reaction of the amine with fluorine.

While it is known that amines will react with fluorine, the reaction has not been heretofore successful in the fluorination of the amines. In the reaction, cleavage of the carbon-nitrogen bond is usually obtained resulting in products, such as carbon tetrafluoride, hydrogen fluoride, nitrogen, and nitrogen trifluoride. Amines such as the carbamic acid and cyanuric acid amines when fluorinated result in compounds which have a high specific impulse and find use as monopropellants or as oxidants for metallic fuels in rocket and missile propellants.

It is therefore an object of this invention to provide a process for the fluorination of amines. It is a further object to provide a process for the fluorination of amines wherein substantially no decomposition of the amine is obtained. A still further object is to provide a process for recovering and purifying the fluorinated amine product.

The above and other objects are obtained according to this invention by intermixing the amine with an alkali metal fluoride, alkaline earth metal fluoride or an oxide of alkaline earth metals, aluminum, vanadium, titanium and zirconium, and contacting the resulting mixture with fluorine to fluorinate the amine in the presence of the particular metal fluoride or oxide. The fluorination of the amine is obtained with substantially no scission of the carbon-nitrogen bond.

The fluorinated amine product obtained is usually a solid or liquid which remains intermixed with the reacted mixture. The product may be recovered from the reacted product by extracting the fluorinated amine from the reaction mixture with an organic solvent, such as a low molecular weight alkyl ether, a low molecular weight aliphatic alcohol, a chlorinated aliphatic hydrocarbon solvent having up to 2 carbon atoms, benzene, and tetrahydrofuran. The fluorinated amine may be then recovered from the solvent.

Whether the particular metal fluoride or oxide intermixed with the amine has a catalytic or some other effect in promoting the reaction is not definitely known. There is indication that the particular fluorides or oxides may act as catalysts. It is also possible that the fluorides and oxides serve as acceptors of hydrogen fluoride which is formed as the result of the fluorination to keep the hydrogen fluoride from attacking the amine and decomposing it. The alkali metal and alkaline earth metal fluorides are preferred, with optimum results being obtained with lithium or magnesium fluoride.

In carrying out the reaction, the amine and the particular metal fluoride or oxide are intermixed and the mixture is contacted with gaseous fluorine generally diluted with an inert diluent. Various known methods and equipment for carrying out gas-solid reaction may be used. A fixed or fluidized bed reactor is often the most convenient method. Although the weight ratio of metal flouride or oxide to amine used may be as little as 0.5:1, generally an amount greater than that of the amine is used. It may be high as 10 times the weight of the amine. However, generally, it is preferred to use an amount of the metal fluoride or oxide which is from 2 to 5 times greater than that of the amine.

Any inert gaseous diluent may be intermixed with fluorine used in the fluorination. Normally nitrogen is used due to its availability. The fluorine concentration in the gaseous mixture is generally in the range of 1 to 30 volume percent, although fluorine may be used without dilution. With a concentration below 1 volume percent of fluorine, the reaction rate is too slow for practical usage although operative. A gas mixture containing over 50 volume percent of fluorine is seldom employed.

Illustrative examples of the amines of carbamic and cyanuric acid which may be thus fluorinated without decomposition are urea, thiourea, guanidine, and melamine. The process is also effective for the fluorination of the amine even though the amine may be combined with other molecules such as in coordination products or acids. Many of the carbamic and cyanuric acid amines combine with mineral acids, such as hydrofluoric, perchloric, sulfuric and carbonic acids, to form, for example, urea hydrogen fluoride, urea perchlorate, urea sulfate, and urea carbonate. These amines also form coordination compounds, such as hexakisurea magnesium (II) perchlorate, with alkali and alkaline earth metal salts where the amine is a ligand. The coordination compound generally decomposes in presence of fluorine to form the alkali or alkaline earth metal fluoride in situ.

Since generally the weight of the oxide or fluoride used is greater than of the amine, the fluorinated amine product obtained is dispersed and intermixed with the metal fluoride or oxide in the reaction mixture. The most convenient way to recover the fluorinated amine is by extraction with an organic solvent. Any solvent which dissolves the fluorinated amine and not the metal fluoride or oxide may be used. Solvents such as diethyl ether, methyl ethyl ether, propyl ether, propanol, ethanol, methanol, carbon tetrachloride, chloroform, methyl chloroform, methylene chloride, benzene and tetrahydrofuran are illustrative examples of some of these solvents. Diethyl ether and benzene are the most effective. Benzene is the most selective. In the fluorination, for example of urea, the product obtained will be mainly anhydrous 1,1-difluorourea. However, it may also contain a small amount of 1,1-difluorourea monohydrate. Benzene extracts or dissolve only the anhydrous material leaving the monohydrate in the residue. With diethyl ether and other solvents both the monohydrate and anhydrous product are normally dissolved and thus an additional resublimation step may be necessary to remove the monohydrate from the anhydrous material.

Generally in contacting the solvent with the reaction mixture the solvent will also pick up some hydrogen fluoride and some of the amines which may have combined with the hydrofluoric acid present to form the hydrofluoric acid salts, such as urea hydrogen fluoride. These impurities may be very conveniently removed from the solution by the addition of an alkali metal fluoride, such as sodium or potassium fluoride. The alkali metal fluoride decomposes the amine hydrogen fluoride and reacts with the free hydrogen fluoride forming an alkali metal hydrogen fluoride which is insoluble in the solvent and thus precipitates out. The amine free of the hydrogen fluoride is also insoluble in the solvent. After removing the hydrogen fluoride and the amine, the solution may be evaporated and the fluorination product crystallized out by evaporation or by addition of an aliphatic hydrocarbon solvent, such as pentane, hexane or other mineral spirits to "salt out" the fluorinated amine. Further purification may be obtained by sublimation and recondensation of the fluorinated amine.

Although a temperature in the range of −78° C. to 50° C. may be used in the reaction and the recovery steps, generally a temperature in the range of 0° to 20° C. or room temperature is used. Temperatures above room temperatures do not offer any particular advantage. Since the fluorinated amine may be explosive, the use of a lower temperature in the reaction and the recovery of the product is preferred.

The following examples further illustrate the invention.

*Example I*

To a closed 8 liter stainless steel reactor, 120 grams of urea and 480 grams of magnesium fluoride were added. The urea and magnesium fluoride were intermixed and a fluorine stream containing 20 percent fluorine and the balance nitrogen was fed into the reactor at the top at a rate of 1000 to 1500 milliliters per minute. During this time the urea and magnesium fluoride were stirred within the reactor. The exterior of the reactor was cooled to 0° C.

Upon substantial completion of the reaction, the reaction product was flushed with dry nitrogen gas to remove any fluorine which may have been adsorbed. The product was then extracted with 400 milliliters of diethyl ether per 100 grams of the fluorinated product. The extractant obtained was filtered and a resulting solution of 1,1-difluorourea and 1,1-difluorourea monohydrate, urea hydrofluoride, and free hydrofluoric acid was obtained. Approximately 100 grams of sodium fluoride was then added to the filtrate and stirred for about 2 minutes. The free hydrogen fluoride and the hydrogen fluoride in the urea hydrogen fluoride were removed from the filtrate as $NaHF_2$ which is insoluble. The extraction of hydrogen fluoride from the urea hydrogen fluoride also resulted in the precipitation of the urea. The treated filtrate was then refiltered and the resulting filtrate evaporated at room temperature in vacuum to completely remove the solvent. A viscous liquid product was obtained which was sublimed at room temperature in vacuum and recondensed on a cold surface. A pure white crystalline solid in an amount of about 55 grams was thus obtained. Analysis of the product showed that it contained 12.6 percent carbon, 2.1 percent hydrogen and 38.7 percent fluoride. This compared to a theoretical analysis for 1,1-difluorourea of 12.5 percent carbon, 2.1 percent hydrogen and 39.3 percent fluorine.

In a manner similar to that described above, the run above was repeated except that sodium fluoride was used in place of magnesium fluoride. Twenty-five grams of pure white crystalline solid was obtained after sublimation of the recovered product.

Also, the run was repeated wherein 120 grams of urea was intermixed with 380 grams of magnesium fluoride, and 100 grams of sodium fluoride. This mixture was contacted with a fluorine gas stream containing 50 percent fluorine and the balance nitrogen at a rate of 400 ml. per minute for 5 hours. Ninety grams of the difluorourea product was obtained.

Similar results were obtained when lithium fluoride, strontium fluoride, barium fluoride, magnesium oxide, aluminum oxide, zirconium oxide and vanadium oxide were used in place of magnesium fluoride and the mixture of magnesium fluoride and sodium fluoride.

*Example II*

In a manner similar to that described in Example I, 22 grams of the magnesium perchlorate-urea coordination compound $[(MgClO_4)_2 \cdot 6(NH_2)_2C=O]$ was placed in the stainless steel reactor. While the coordination compound stirred, it was contacted for 1 hour with a stream containing 20 percent fluorine and the balance nitrogen. After 1 hour the reaction mixture had a weight gain of 5 grams. The reaction product was extracted with diethyl ether, dried and again retreated with the 20 volume percent fluorine stream for 2 hours. After the second treatment the product was again extracted with ethyl ether, leaving 4 grams of unreacted solids. The ether extract was treated with sodium fluoride to remove the free HF, filtered and evaporated under vacuum to a liquid. The crude product in an amount of 15 grams was recovered which was then sublimed and condensed on a cool surface. After sublimation it was found that the material was essentially 1,1-difluorourea. The 4 grams of residue of reacted solids which remained after the second extraction of the reaction mixture with ethyl ether was found to be substantially all amorphous magnesium fluoride.

*Example III*

To a 1 liter closed nickel reactor, 10 grams of melamine were intermixed with 60 grams of sodium fluoride. A stream containing 10 percent fluorine and the balance nitrogen was charged into the closed reactor. The reactor was cooled in wet ice and the exit gases containing nitrogen and fluorine were passed through a trap cooled with Dry Ice before venting. The reactor was not stirred.

After about 10 hours of fluorination, about 2 to 3 grams of liquid products had collected in the trap. This was transferred to a polyethylene vial and stored at 0° C. for testing and analysis. Titration of the iodine released by reaction with potassium iodide gave an active fluorine content of 47.8 percent by weight. This compared to 49.5 percent by weight of fluorine in fluoromelamine. Analysis of the crude material by mass spectroscopy, infrared and nuclear magnetic resonance indicated the structure appeared to be that of fluoromelamine.

The run above was repeated except that the metal fluoride was composed of 10 grams of magnesium fluoride and 50 grams of sodium fluoride. In 10 hours of fluorination without stirring 3 grams of product was obtained.

What is claimed is:

1. A process for the fluorination of an amine, which comprises intermixing an amine selected from the group consisting of urea, thiourea, guanidine, and melamine with a compound selected from the group consisting of alkali metal fluorides, alkaline earth metal fluorides, and oxides of alkaline earth metals, aluminum, titanium, vanadium, and zirconium, contacting the resulting mixture with fluorine to fluorinate the amine, and recovering the fluorinated amine from the reaction mixture.

2. A process for the fluorination of an amine which comprises intermixing an amine selected from the group consisting of urea, thiourea, quanidine, and melamine with a compound selected from the group consisting of alkali metal fluorides, alkaline earth metal fluorides, and oxides of alkaline earth metals, aluminum, titanium, vanadium, and zirconium, said compound being intermixed with the amine in a weight ratio of from 0.5 to 10 parts of the compound per one part of the amine, contacting at a temperature in the range of −78° C. to 50° C. the resulting mixture with a gaseous stream containing up to 50 volume percent of fluorine and the remainder a inert gaseous diluent to fluorinate the amine, and recovering the fluorinated amine from the reaction mixture.

3. A process according to claim 2 wherein the amine is melamine.

4. A process according to claim 2 wherein the amine is urea.

5. A process for the fluorination of an amine which comprises intermixing an amine selected from the group consisting of urea, thiourea, quanidine, and melamine with a compound selected from the group consisting of alkali metal fluorides, alkaline earth metal fluorides, and oxides of alkaline earth metals, aluminum, titanium, vanadium, and zirconium, said compound being intermixed with the amine in a weight ratio of from 2 to 5 parts of the compound per part of the amine, contacting at a temperature in the range of 0° to 20° C. the resulting mixture in a gaseous fluorine stream containing from 1.0 to 30 percent fluorine and the balance an inert gas to fluorinate the amine, and recovering the fluorinated amine from the reaction mixture.

6. A process according to claim 5 wherein the amine is urea.

7. In a process for the fluorination of an amine wherein an amine selected from the group consisting of urea, thiourea, guanidine, and melamine is intermixed with a compound selected from the group consisting of alkali metal fluorides, alkaline earth metal fluorides, and oxides of alkaline earth metals, aluminum, titanium, vanadium, and zirconium and contacted with gaseous fluorine to fluorinate the amine, the step of recovering the fluorinated amine from the reaction mixture, which comprises contacting the reaction mixture with an inert solvent selected from the group consisting of low molecular weight alkyl ethers, low molecular weight aliphatic alcohols, chlorinated aliphatic hydrocarbon solvents having up to 2 carbon atoms, benzene, and tetrahydrofuran to extract the fluorinated amine from the reaction mixture, and recovering the fluorinated amine from the solvent.

8. In a process for the fluorination of an amine wherein an amine selected from the group consisting of urea, thiourea, guanidine, and melamine is intermixed with a compound selected from the group consisting of alkali metal fluorides, alkaline earth metal fluorides, and oxides of alkaline earth metals, aluminum, titanium, vanadium, and zirconium and contacted with gaseous fluorine to fluorinate the amine, the steps of recovering the fluorinated amine from the reaction mixture, which comprises contacting the reacted mixture with an inert solvent selected from the group consisting of low molecular weight alkyl ethers, low molecular weight aliphatic alcohols, chlorinated aliphatic hydrocarbon solvents having up to 2 carbon atoms, benzene, and tetrahydrofuran to extract the fluorinated amine from the reacted mixture, separating the contacted reacted mixture from the solvent, adding an alkali metal fluoride to the solvent containing the fluorinated amine and impurities extracted from the reacted mixture to react the impurities with the alkali metal fluoride and precipitate the impurities, separating the precipitated impurities from the solvent, and crystallizing the fluorinated amine from the solvent.

9. A process according to claim 8 wherein the solvent is diethyl ether and the alkali metal fluoride is sodium fluoride.

10. A process for the fluorination of urea which comprises intermixing urea with magnesium fluoride in a weight ratio of from 2 to 5 parts of the magnesium fluoride per part of urea contacting the resulting mixture with a gaseous fluorine stream containing from 1.0 to 30 volume percent of fluorine and the remainder an inert gaseous diluent to fluorinate the urea, treating the reacted mixture with benzene to extract the fluorinated amine from the reacted mixture, separating the solvent containing the fluorinated amine from the treated reacted mixture, adding to the benzene containing the fluorinated amine solium fluoride to react and precipitate impurities extracted from the reacted mixture by the benzene, separating the precipitated impurities from the benzene, and crystallizing the fluorinated urea from the benzene.

No references cited.

WALTER A. MODANCE, *Primary Examiner.*

L. D. ROSDOL, ROGER L. CAMPBELL, *Examiners.*